US007297217B2

(12) United States Patent
Dewitt

(10) Patent No.: US 7,297,217 B2
(45) Date of Patent: Nov. 20, 2007

(54) METHOD AND APPARATUS FOR APPLYING LOW VISCOSITY CYANOACRYLATE ADHESIVE ON WOODEN FURNITURE

(75) Inventor: David Dewitt, Oswego, IL (US)

(73) Assignee: The Wonderlokking Corp., Wisconsin Rapids, WI (US)

( * ) Notice: Subject to any disclaimer, the term of this patent is extended or adjusted under 35 U.S.C. 154(b) by 311 days.

(21) Appl. No.: 10/445,562

(22) Filed: May 27, 2003

(65) Prior Publication Data

US 2003/0201056 A1 Oct. 30, 2003

Related U.S. Application Data

(63) Continuation of application No. 09/805,803, filed on Mar. 13, 2001, now Pat. No. 6,613,183.

(51) Int. Cl.
*B32B 37/00* (2006.01)
*C09J 5/00* (2006.01)

(52) U.S. Cl. ...................... 156/94; 156/331.5; 156/305

(58) Field of Classification Search ................ 156/305, 156/325, 94, 331.5; 401/9, 137, 265; 222/527
See application file for complete search history.

(56) References Cited

U.S. PATENT DOCUMENTS 2,040,126 A 5/1936 Grieve
2,776,232 A * 1/1957 Shearer, Jr. et al. ........ 428/522
2,784,215 A * 3/1957 Joyner ........................ 558/307
2,794,788 A * 6/1957 Coover, Jr. et al. ......... 524/418
2,849,739 A 9/1958 Dresden
2,877,480 A * 3/1959 Warren .......................... 401/9
2,953,285 A 9/1960 McKelvey
3,030,952 A 4/1962 Elder
3,105,618 A 10/1963 Whitley
3,134,515 A 5/1964 Callahan, Jr.
3,389,037 A * 6/1968 Monfort ..................... 156/305
3,572,558 A 3/1971 Hooker
3,858,739 A * 1/1975 Turner et al. ............ 222/541.5
4,138,040 A 2/1979 Stock
4,215,173 A * 7/1980 Hubbard ..................... 428/331
4,217,994 A 8/1980 Koenig et al.
4,408,699 A * 10/1983 Stock ...................... 222/541.5
4,526,490 A 7/1985 Welsh
4,702,783 A 10/1987 Mason, III
4,760,937 A 8/1988 Evezich
4,906,317 A 3/1990 Liu
4,917,267 A 4/1990 Laverdure
5,261,572 A 11/1993 Strater
5,456,388 A * 10/1995 Honstein et al. ............ 222/390
6,613,183 B2 * 9/2003 Dewitt ....................... 156/305

* cited by examiner

*Primary Examiner*—Jeff H. Aftergut
(74) *Attorney, Agent, or Firm*—Schmeiser, Olsen & Watts

(57) ABSTRACT

The invention is a method for application of a special low viscosity cyanoacrylate adhesive which is used for the manufacture and repair of wooden furniture. The cyanoacrylate adhesive quickly penetrates and bonds wood to wood. The wooden furniture that results from the process of this invention are cohesive in structure and are ready for immediate use. This special wood grade cyanoacrylate adhesive provided by this invention permits those in the furniture repair or furniture manufacture industries with a method of repairing or assembling wooden furniture in an easy and quick manner.

20 Claims, 3 Drawing Sheets

METHOD AND APPARATUS FOR APPLYING LOW VISCOSITY CYANOACRYLATE ADHESIVE ON WOODEN FURNITURE

This application is a continuation of Ser. No. 09/805,803, filed Mar. 13, 2001, now U.S. Pat. No. 6,613,183

FIELD OF THE INVENTION

The present invention relates to application of adhesives, and, more particularly, to a low viscosity cyanoacrylate adhesive used for wooden furniture repair or manufacture.

BACKGROUND OF THE INVENTION

In the past, wooden furniture was made by mechanical fastening systems or the use of epoxy/water based adhesives. These adhesives needed to be pre-applied to the joint and then assembled, thus, not allowing for easy repair of loosened joints. Up to 24 hours was needed for clean up of excessive adhesive and fixturing was required while the adhesive hardened. These adhesives would normally comprise of two or more components which required the measuring of each of the components and the mixing of these components together. Furthermore, the pot life of these mixtures needed to be taken into consideration, making it necessary to take and keep copious notes on the mixtures and each component. Water based adhesives would shrink, thus allowing for gaps in joints which make them susceptible to loosening and squeaking.

The shape and form of any fluid dispenser is primarily due to the type of liquid or flowable material being dispensed therefrom and the use thereof. Adhesive dispensers are frequently styled to direct the material to a desired location which may be of a small area or otherwise in a location difficult to reach, such as the area between the joints of furniture. These dispensers have long applicators or various tubing to achieve the desired result. Some examples of such known dispensers are illustrated in the following patents:

U.S. Pat. No. 4,217,994 to Koenig et al. illustrates a glue dispenser with a self-closing valve. The upper end of the glue dispenser is cone shaped which is provided with an axial round bore in which a cylindrical rod is located. The glue flows through the space between the round bore and the cylindrical rod by pressure on the bottle.

U.S. Pat. No. 4,760,937 to Evezich discloses a dispenser with a deformable inner container and resilient outer container. A curved nozzle and various cylindrical nozzle extenders attach to the resilient outer container.

U.S. Pat. No. 4,917,267 to Laverdure shows an dispenser attachment with a squeezable self-closing valve. The neck is shaped in an untapered cylindrical shape including a neck outlet through which material is discharged. A collar is used to secure a discharge nozzle to the neck which extends to a curved quadrant shaped valve.

U.S. Pat. No. 3,030,952 to Elder discusses a flexible plastic container for sterile injectable fluids. A tube, connected to a connector, protrudes from the container. The components of the connector, namely a drip tube, needle adapter and needle, dispense of the contents in the container.

U.S. Pat. No. 3,105,618 to Whitley discloses a squeeze bottle and fluid distributor. A measuring tube expels liquid from the squeeze bottle.

U.S. Pat. No. 3,134,515 to Callahan shows a leak detector apparatus. A test liquid bottle provided with a suitable stopper includes a relatively thin pliable tube slidably fitted therein. The tube permits a considerable degree of control to be exercised by the operator over the zones to which the test fluid is applied. Couplings located in relatively inaccessible places may be tested with greatly increased facility.

U.S. Pat. No. 5,261,572 to Strater shows a dropper bottle employing a conventional flexible bottle and cover with a conical tip having a hole in the end thereof. An adapter sits between the mouth of the bottle and a ferrule of a needle and includes a passage for fluid between the bottle and the needle.

U.S. Pat. No. 3,572,558 to Hooker illustrates a dropper dispenser with a squeeze bottle and tube. The tube extends through the bottle cap with its discharge end fitted to hold a tip. The tip includes a capillary tube member and elongated drop conveying stem. The tube is deformed to hold the stem in place while allowing a passage for the liquid from the bottle.

U.S. Pat. No. 4,526,490 to Welsh discloses a dispenser formed with filling and discharge openings at opposite ends with a flexible discharge spout. The discharge spout is elongated and flexible and of uniform very small diameter to control discharge of precise amounts of material directed to desired locations of use.

The above prior art summaries are merely representative of portions of the inventions disclosed in each reference. In no instance should these summaries substitute for a thorough reading of each individual reference. All the above references are hereby incorporated by reference.

In the repair and manufacture of wooden furniture, of primary concern is the securing of the joints in a manner where there is no indication of a bonding agent, and where the joints are tight and stay tight. Accordingly, the dispenser and applicator used in wooden furniture need to not only direct the flow to any relatively inaccessible space, but need to prevent leakage of adhesive on other sections of the furniture which is detrimental to the finish.

Many of the applicator tips aforementioned do not tightly encase the dispenser and thus, may easily allow for leaks. Examples of snap-acting securements provide a relatively tight connection, but are only appropriate for a specialized dispenser with snap-engaging members. Other applicator tips described are rigid, not allowing for great flexibility in applying the fluid to relatively inaccessible areas. The previous tips generally end in a rigid, cylindrical opening, which make it more difficult to sparingly apply adhesive between joints of a piece of furniture.

Adhesive discharged from an adhesive dispenser tends to harden inside the closure member, causing a layer of glue which may seal the discharge opening shut, or even seal the closure member to the dispenser. The accumulation of dried adhesive may be difficult if not impossible to remove. Thus, auxiliary tools, such as pliers, etc., are needed in separating the closure member from the adhesive dispenser once the adhesive has been discharged.

SUMMARY OF THE INVENTION

In order to avoid the disadvantages of the prior art, the present invention provides a low viscosity cyanoacrylate adhesive and an adhesive bottle with a unique applicator tip and closure member.

A special low viscosity cyanoacrylate adhesive is used for the manufacture and repair of wooden furniture, since it quickly penetrates and bonds wood to wood. This special wood grade cyanoacrylate adhesive provided by this invention permits those in the furniture repair or furniture manufacture industries with a method of repairing or assembling wooden furniture in an easy and quick manner. The wooden furniture that results from the process of this invention are cohesive in structure and are ready for immediate use.

An applicator tip is disclosed which not only provides a flexible, manipulator for dispensing glue to the joints of wooden furniture, but it also provides a narrow diameter for application in relatively inaccessible areas. The tip is formed from a piece of tubing, one end being frustro-prolated to receive the discharge end of a dispenser and the other end tapering into a capillary tube member with a cylindrical opening, capable of being flattened into a elliptical shape. The frustro-prolated end, when applied to the discharge end of the dispenser, which is a conical port member, forms a snapless suction which prevents undesirable leaks therefrom.

The tip is preferably flexible so that it may be bent into a desired configuration to facilitate the discharge of material to a desired location with accuracy. A wire, or similar elongate member, may be placed within the capillary tube member, allowing for even more precise application of the adhesive.

The dispenser is provided with a closure member having a metallic pin which penetrates into the discharge opening while the closure member is being secured thereon. Additionally, as the closure member tightens onto the dispenser, side protrusions along the inner portion of the closure member scrape the excess adhesive from the discharge end thereof. Opposing side tabs, complimentary to annular protruding ribs on the periphery of the discharge member, lock the closure member thereon, preventing discharge when the same is being stored.

The discharge end of the dispenser is provided with a tiered port member having an axial opening therethrough and to which the applicator tip and closure member therefore interchangeably and selectably may be attached.

In a second embodiment, the dispenser is provided with a closure member which during storage, is inverted, being used as a seal for the conical port member of the dispenser. The inverted closure member is then detached from the conical port member, transposed, and subsequently used so that the material within the dispenser may be secured against discharge as when the same is being stored.

The discharge end of the dispenser is provided with conical shaped port member having an axial opening therethrough and to which the applicator tip and closure member therefore interchangeably and selectably may be attached.

BRIEF DESCRIPTION OF THE DRAWINGS

These and other features of the present invention will become readily apparent upon reading the following detailed description and upon reference to the drawings in which:

FIGS. 2A and 2B are enlarged sectional view showing the details of the closure member of FIG. 1, whereas FIG. 2A is separated along lines 2-2;

FIG. 2B is an enlarged sectional view of FIG. 1;

DETAILED DESCRIPTION OF THE INVENTION

Figure 1:
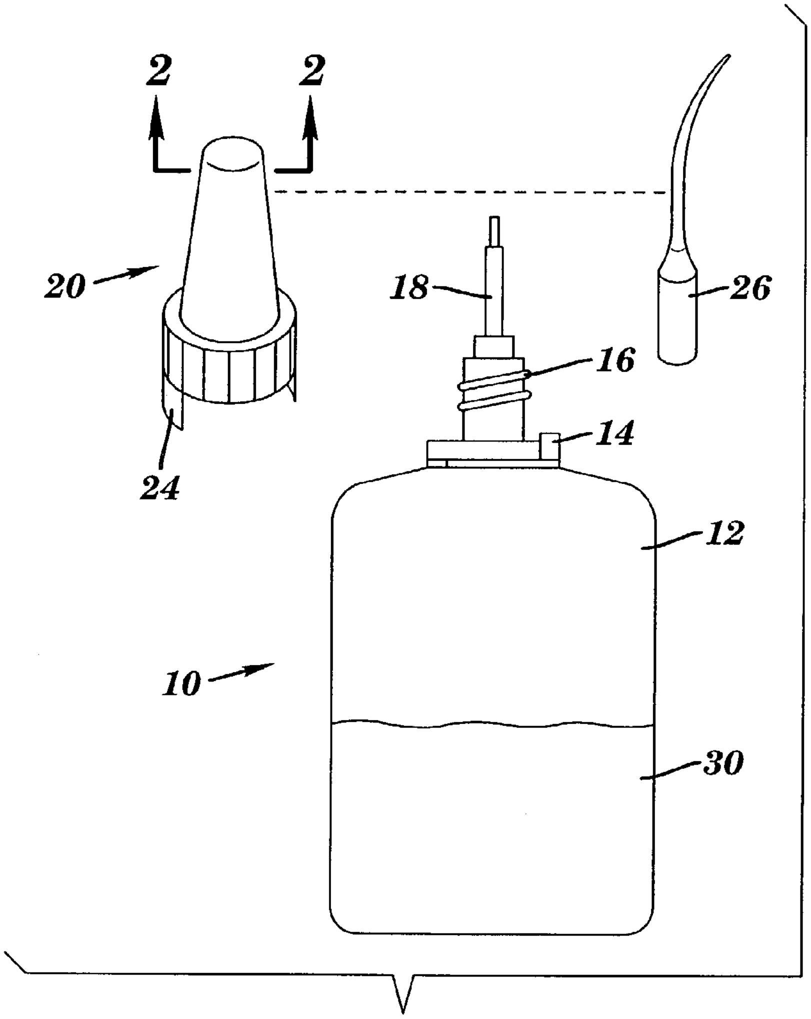
FIG. 1 is an elevational view of the adhesive dispenser and applicator tip as set forth in the present invention.

Referring now specifically to the drawings, there is illustrated an adhesive dispenser and applicator tip, generally designated as 10, in accordance with a preferred embodiment of the present invention, wherein like reference numerals refer to like components throughout the drawings.

An adhesive dispenser 10 is made up of a body 12 and tiered discharge member 18 with an axial opening therethrough. The discharge member comprises peripheral annular protruding ribs 14 and screw abutments 16, shown in FIG. 1. A closure member 20 is provided for the tiered discharge member 18 which locks into place thereon when opposing tabs 24 on the lower portion of the closure member couple with the peripheral annular protruding ribs 14, preventing discharge when the same is being stored. An applicator tip 26, extending from the discharge member a limited distance, is also provided for dispensing the adhesive located in the body 12 of the dispenser 10. The applicator tip and closure member may be interchangeably and selectably attached to the discharge member. The dispenser 10 contains a special low viscosity ethyl cyanoacrylate adhesive 30, which quickly penetrates and bonds woods, ceramics, metals, plastic and rubber, fabric, etc. The adhesive gives faster cure rate on porous acidic materials than the standard grades and is particularly suitable for bonding wood. Furthermore, it cures very rapidly at room temperature: 2-60 seconds with wood (depending on the wood); 1-5 seconds with rubbers (e.g. nitrite, N-butyl and neoprene); 5-30 seconds with metals (e.g. aluminum, mild steel, zinc plated steel); and 2-20 seconds with plastics (e.g. P.V.C., ABS, PMMA, polycarbonate, phenolformaldehyde). General characteristics of the cyanoacrylate adhesive include as follows:

| | |
|---|---|
| Appearance: | Colourless |
| Corrosivity: | None |
| Odour: | Pungent |
| Melting point: | < −30° C. |
| Boiling point: | 36–38° C. (at 0.13 mbar) |
| Flash point: | 83° C. |
| Volatile content: | 0% |
| Relative density: | Approx. 1.0 |
| Solubility in water: | Insoluble and immiscible |
| Gap filling capacity: | Up to 0.05 mm |
| Shelf life: | Greater than 1 year (temp 0–5° C.)<br>Greater than 6 mnths (temp 5°–25° C.) |
| Specific gravity: | 1.05 |
| Toxicity: | Non toxic |
| Type: | Ethyl |
| Viscosity at 25° C.: | 3 mPa · s* |
| Vapour pressure: | Low |
| Temperature resistance: | Up to 80° C. |

*Heavier viscosities do not allow adequate penetration to permit the necessary bonding for the repair of the wide variety of woods used in the construction of furniture.

Other components of the adhesive may include a polymeric thickener (0-20%), and a inorganic thickener (0-10%).

Figure 2A:
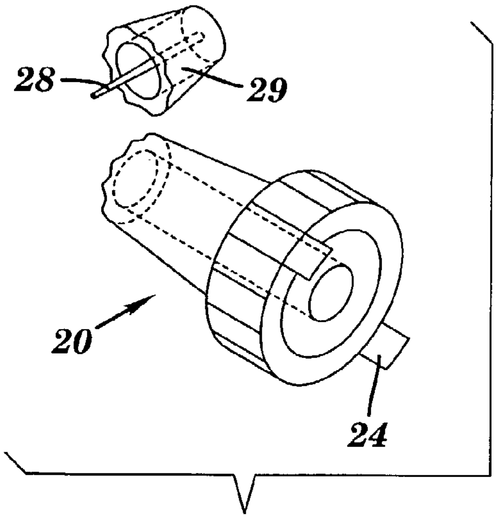
Figure 2B:
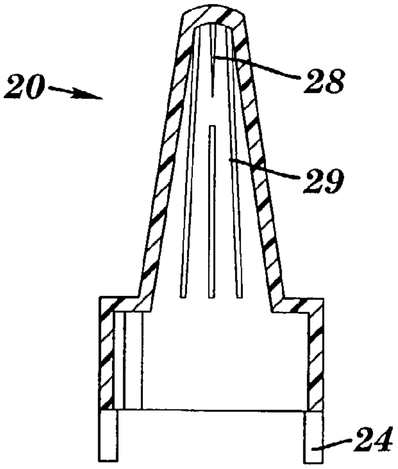

The closure member 20 houses a metallic pin member 28 on its top internal portion. The pin member 28 extends toward and penetrates into the discharge opening while the closure member is being secured thereon, shown in FIGS. 2A and 2B. Though the preferred embodiment discloses a pin made of metal, the material is not limited to such.

Material such as ceramic, plastic, and other suitable material may also be used. Longitudinal side protrusions 29 housed along the inner side portion of the closure member 20 scrape the excess adhesive from the discharge end when fastening on the screw abutments 16 thereof.

Figure 3:
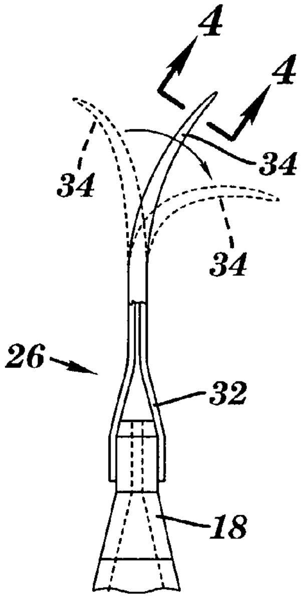
FIG. 3 is several alternative curved positions of the capillary tube member in FIG. 1 shown in phantom.
Figure 4:
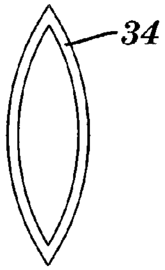
FIG. 4 is an axial cross-sectional view of FIG. 3 taken along lines 4-4.

The applicator tip 26 is formed from a piece of polyethylene tubing or similar material, or similar material, allowing for flexibility and ease of manipulation, shown in FIG. 3. One end 32 of the applicator tip 26 is frustro-prolated to receive the discharge end 18 of a dispenser. The other end 34 tapers into a flexible capillary tube, extending a limited distance from the frustro-prolated portion 32. The tubing terminates with a cylindrical bore of small diameter 34, capable of being flattened or manipulated into a elliptical shape (see FIG. 4). The frustro-prolated end 32, when applied to the conical port member 14, forms a slidably engaging, snapless suction which prevents undesirable leaks therefrom. The applicator tip 26 is not limited for use with the embodied dispenser, it may also be used on other dispensers with similar discharge apertures.

The capillary tube member 34 is capable of being bent into a desired configuration to facilitate the discharge of material to a desired location with accuracy. A wire (not shown), or similar elongate member, may be placed within the capillary tube member 34, allowing for even more precise application of the adhesive.

Figure 5:
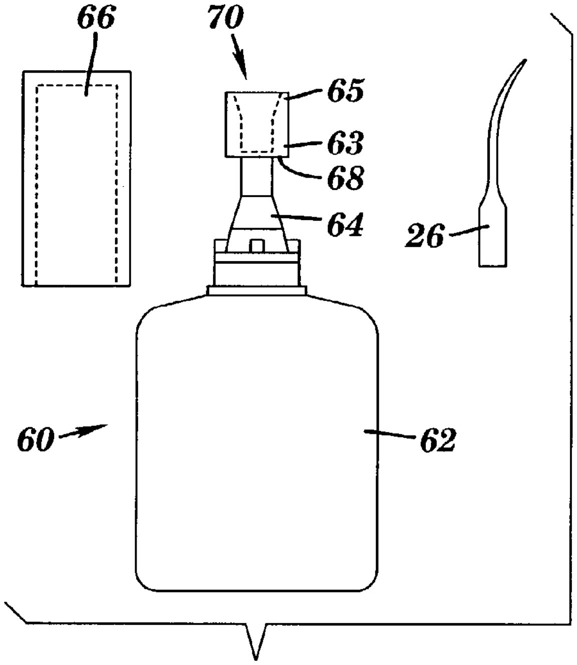
FIG. 5 is an elevational view of a second embodiment of the adhesive dispenser as set forth in the present invention.
Figure 6:
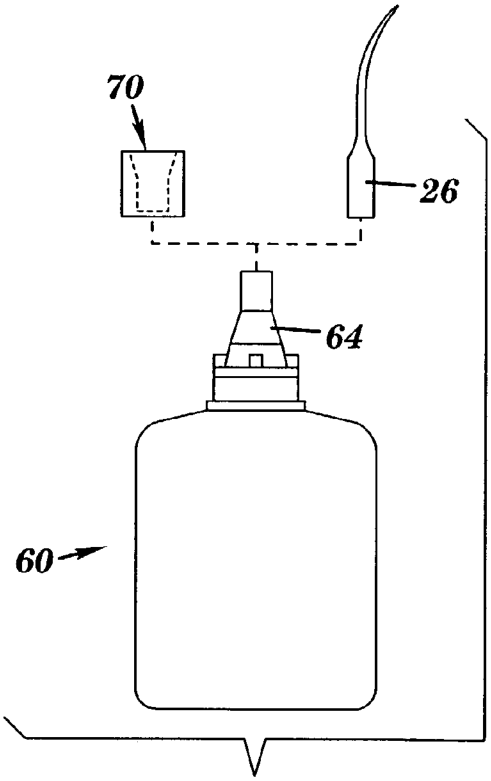
FIG. 6 is an elevational view illustrating the various elements which are connected together in the dispenser shown in FIG. 5.

A second embodiment of the present invention is shown in FIGS. 5 and 6. Referring now to FIG. 5, there is portrayed therein a dispenser 60 which is made up of a squeezable body 62 and discharge member 64 having a conical-shaped port member and axial opening therethrough. An closure member 70 is provided for the conical port member which originates as a manufacture seal when inverted, with its bottom portion 63 sealing off the axial aperture and its side portions 65 extending away from the dispenser. The closure member is then severed along section 68 and used subsequently to secure the dispenser 60 against discharge. The conical port member, closure member and applicator tip are all housed within a removable rectangular member 66.

The applicator tip 26 and closure member 70 may be interchangeably and selectably attached to the conical port member 64, shown in FIG. 6. Once the closure member 70 is originally detached from the conical port member, it is inverted to secure the dispenser 60 against discharge when the material is to be stored.

A desired amount of the contents in the dispenser may be discharged from the applicator tip 26 accurately to a desired location by squeezing the sides of the dispenser body 62. Upon releasing the sides thereof, flow is instantly stopped and may even be retracted into the conical port member 64 from the applicator tip 26.

After use, the applicator tip 26 is cleared by holding the bottle upright and squeezing the dispenser body 62. The dispenser body 62 is released and air returning through the capillary tip 26 clears the tip by velocity of the returning air which is enhanced by gravity from the bottle being in the upright position.

Figure 7:
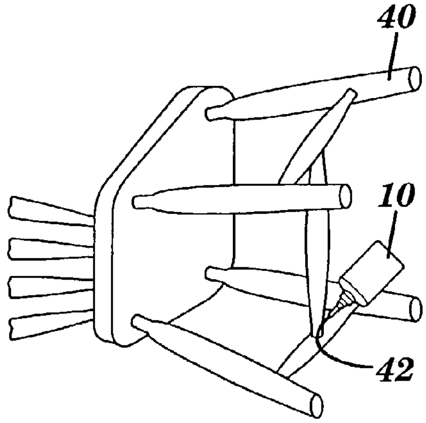
FIG. 7 is the preferred use of FIG. 1.

Once the applicator tip is firmly attached to the tiered port member 18 (FIG. 1) or the conical port member 64 (FIG. 5), the cyanoacrylate based adhesive contained within the dispenser 10 is then used to bond or assemble such things as wooden joints 42 of a chair 40, shown in FIG. 7, or other such articles made of wood, ceramic, metal, plastic and rubber, fabric, etc. The applicator tip aids in the proper application of the cyanoacrylate adhesive into the joint 42, leaving no indication of adhesive application. The adhesive is expelled from the dispenser 10 and applied to joints by tracing the joint lines thereof. The wooden furniture that results from this process are cohesive in structure and are ready for immediate use.

Figure 8:
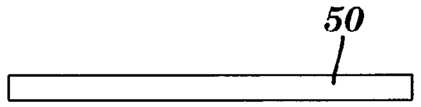
FIGS. 8, 9, 10, 11, and 12 all illustrate the process by which the capillary applicator tip of FIG. 1 is made.
Figure 9:
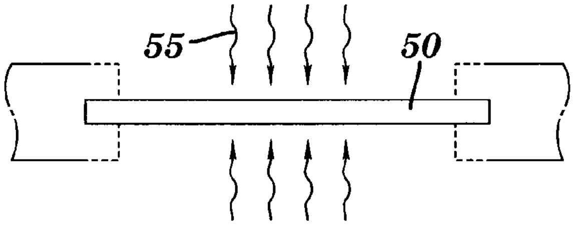
Figure 10:
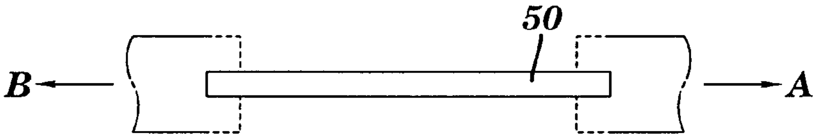
Figure 11:
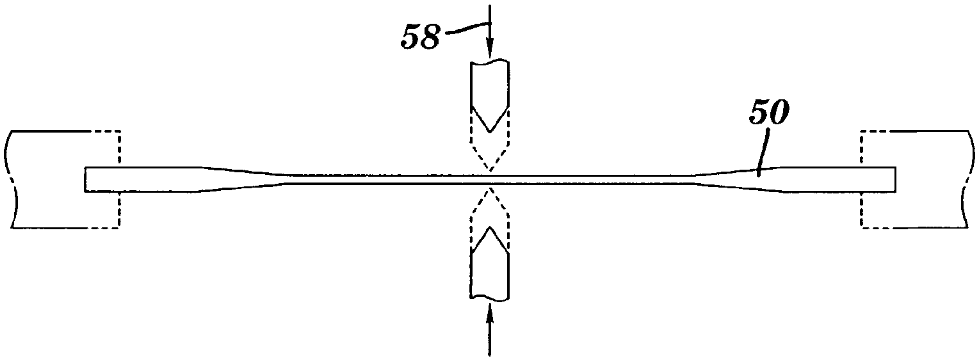
Figure 12:
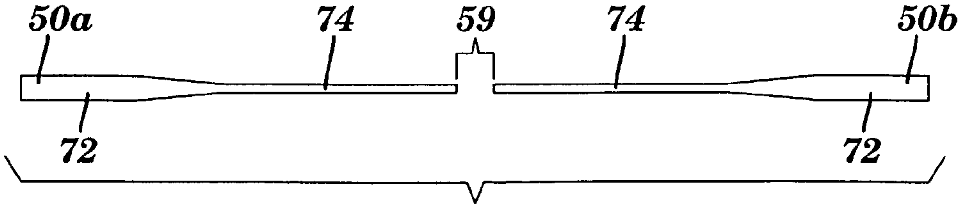

The applicator tip is made from a long flexible elongate tube 50, shown in FIG. 8. The tube preferable is fabricated from materials that are tractable, flexible and manipulative, such as polyethylene or similar material, etc., and is uniform in shape and diameter. Heat 55 is applied to the midsection of the elongate tube 50, shown in FIG. 9. The forming of the tube may be accomplished with conventional heat forming tools, electric or cored hot water units. Ultrasonic forming and welding may also be used depending on the type and thickness of the plastic. opposing longitudinal pressure A and B is then applied to either end of the tube as shown in FIG. 10, causing the heated midsection of the tube to stretch, forming a thin cylindrical tube such as a capillary tube. While this pressure is maintained, cutting means 58, shown in FIG. 11, bisect the tube resulting in identical tubing halves **50*a* and 50*b*, shown in FIG. 12. A tubing half 50*a* is then used in the present embodiment as the aforementioned applicator tip, consisting of a frustro-prolated portion 72 and a capillary tube member 74**.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. A method for bonding a first surface to a second surface comprising the steps of:

providing a low viscosity cyanoacrylate adhesive in a dispenser, wherein said dispenser is sealed by a bottom portion of a closure member, said closure member is dimensioned to reseal said dispenser;

providing an applicator tip having a first end for receiving a discharge end of the dispenser and a second end having a capillary tube, wherein said second end is bendable into a curved position so said applicator tip guides said adhesive;

severing the closure member from the dispenser to create a port member on the discharge end of the dispenser;

engaging the first end of the applicator tip over the port member on the discharge end of the dispenser to create a leakproof seal by snapless suction between the port member and the first end of the applicator;

discharging said low viscosity cyanoacrylate adhesive from said applicator tip while tracing said second end of said applicator tip along said first surface; and securing said first surface to said second surface with said cyanoacrylate.

2. The method of claim 1 wherein discharging said cyanoacrylate adhesive from said applicator tip includes discharging said cyanoacrylate adhesive between said first surface and said second surface.

3. The method of claim 2 wherein discharging said cyanoacrylate adhesive between said first surface and said second surface is performed while said first surface and said second surface are physically joined at a joint.

4. The method of claim 3 wherein discharging said cyanoacrylate adhesive between said first surface and said second surface is performed by discharging said adhesive into the joint, leaving no indication of adhesive application visible outside of the joint.

5. The method of claim 1 wherein the first surface is a surface of a first wooden article and the second surface is a surface of a second wooden article.

6. The method of claim 5 wherein the first wooden article is a first component part of a furniture and the second wooden article is a second component part of a furniture.

7. The method of claim 1 further comprising the step of: providing a squeezable body.

8. The method of claim 7 further comprising the step of: squeezing said dispenser to clear said capillary tube.

9. The method of claim 1 further comprising:

disengaging the applicator tip from the dispenser; and securing the closure end onto the port member of the dispenser, wherein said low viscosity is 3 mPa at 25° c.

10. The method of claim 1 wherein tracing said applicator tip along said first surface is performed by tracing said applicator tip between said first surface and said second surface.

11. The method of claim 1 further comprising the step of:

removing said first end of said capillary tube from said port member of said dispenser.

12. A method for bonding a first surface to a second surface comprising the steps of:

providing a low viscosity cyanoacrylate adhesive in a dispenser, wherein said dispenser is sealed by a bottom portion of a closure member, said closure member is dimensioned to reseal said dispenser;

providing an applicator tip having a first end for receiving a discharge end of the dispenser and a second end having a capillary tube, wherein said second end is bendable to curve said applicator tip to guide said adhesive;

flattening said capillary tube into an elliptical shape;

severing the closure member from the dispenser to create a port member;

engaging the first end of the applicator tip over the port member of the dispenser;

discharging said low viscosity cyanoacrylate adhesive from said applicator tip while tracing said applicator tip along said first surface; and securing said first surface to said second surface with said cyanoacrylate.

13. A method for bonding a first surface to a second surface comprising the steps of:

providing a low viscosity cyanoacrylate adhesive in a dispenser, wherein said dispenser is sealed by a bottom portion of a closure member, said closure member is dimensioned to reseal said dispenser;

providing a removable member for storage of said closure member and said applicator tip;

providing an applicator tip having a first end for receiving a discharge end of the dispenser and a second end having a capillary tube, wherein said second end is bendable to curve said applicator tip to guide said adhesive;

severing the closure member from the dispenser to create a port member;

engaging the first end of the applicator tip over the port member of the dispenser;

discharging said low viscosity cyanoacrylate adhesive from said applicator tip while tracing said applicator tip along said first surface; and securing said first surface to said second surface with said cyanoacrylate.

14. A method for bonding a first surface to a second surface comprising the steps of:

providing a dispenser with a squeezable body, said body having a tiered discharge member and screw abutments, said body containing a low viscosity cyanoacrylate adhesive;

providing an applicator tip, said applicator tip having a first end configured for receiving said tiered discharge member of said body and a second end having a capillary tube;

providing a closure member for said dispenser;

removing said closure member from said dispenser;

engaging the first end of the applicator tip over said tiered discharge member of the dispenser;

curving the second end of the applicator tip to a desired position to direct flow of adhesive;

discharging said low viscosity cyanoacrylate adhesive from said applicator tip while tracing said applicator tip along said first surface; and securing said first surface to said second surface with said cyanoacrylate.

15. The method of claim 14 further comprising the step of:

providing a pin member in said closure member.

16. The method of claim 14 further comprising the step of:

providing opposing tabs on said closure member.

17. The method of claim 14 further comprising the step of:

providing protruding ribs on said body.

18. The method of claim 17 further comprising the step of:

providing opposing tabs on said closure member; and rotating said closure member to couple said opposing tabs with said protruding ribs on said body.

19. The method of claim 14 further comprising the step of:

providing longitudinal side portions within an inner side portion of the closure member; and scrapping an excess adhesive from the discharge end.

20. The method of claim 14 wherein discharging said cyanoacrylate adhesive from said applicator tip includes discharging said cyanoacrylate adhesive between said first surface and said second surface.

* * * * *